(12) United States Patent
Curry et al.

(10) Patent No.: US 7,375,856 B2
(45) Date of Patent: May 20, 2008

(54) HALFTONE SCREEN FREQUENCY AND MAGNITUDE ESTIMATION FOR DIGITAL DESCREENING OF DOCUMENTS

(75) Inventors: Donald J. Curry, Menlo Park, CA (US); Doron Kletter, San Mateo, CA (US); Asghar Nafarieh, Menlo Park, CA (US)

(73) Assignee: Xerox Corporation, Norwalk, CT (US)

( * ) Notice: Subject to any disclaimer, the term of this patent is extended or adjusted under 35 U.S.C. 154(b) by 1037 days.

(21) Appl. No.: 10/612,084

(22) Filed: Jul. 1, 2003

(65) Prior Publication Data
US 2004/0051909 A1 Mar. 18, 2004

Related U.S. Application Data

(60) Provisional application No. 60/393,244, filed on Jul. 1, 2002.

(51) Int. Cl.
*G06T 5/00* (2006.01)
*H04N 1/409* (2006.01)

(52) U.S. Cl. .......... 358/3.08; 358/3.2; 358/3.26; 358/1.9; 358/3.06; 358/534; 358/536; 358/463; 382/254; 382/260; 382/261; 382/263; 382/265; 382/274; 382/264; 382/284

(58) Field of Classification Search ............. None
See application file for complete search history.

(56) References Cited

U.S. PATENT DOCUMENTS 4,849,914 A 7/1989 Medioni et al.
5,515,452 A 5/1996 Penkethman et al.
5,583,659 A 12/1996 Lee et al.
5,638,134 A * 6/1997 Kameyama et al. ........ 348/607
5,745,596 A 4/1998 Jefferson
5,900,953 A 5/1999 Bottou et al.
6,058,214 A 5/2000 Bottou et al.

(Continued)

FOREIGN PATENT DOCUMENTS

EP    0 712 094 A2    5/1996
EP    1 006 716 A2    6/2000

OTHER PUBLICATIONS

U.S. Appl. No. 10/776,515, filed Feb. 12, 2004, Curry et al.

(Continued)

*Primary Examiner*—Twyler Lamb
*Assistant Examiner*—Pawandeep S Dhingra
(74) *Attorney, Agent, or Firm*—Oliff & Berridge, PLC

(57) ABSTRACT

An efficient method and system for eliminating halftone screens from scanned documents while preserving the quality and sharpness of text and line-art is disclosed. The method and system utilizes one or more independent channels with different sensitivities (e.g., Max, High, and Low) to provide high quality frequency and magnitude estimation. The most sensitive channel (Max) derives the frequency estimate, and the remaining channels (e.g., High and Low) are combined to create the screen magnitude. The Max channel is the most sensitive and will usually report the existence of frequencies even when the screen is very weak. Therefore, the screen frequency must be additionally qualified by the screen magnitude. The screen magnitude can be interpreted as the level of confidence that the local neighborhood represents half-toned data.

17 Claims, 7 Drawing Sheets

U.S. PATENT DOCUMENTS

| | | | |
|---|---|---|---|
| 6,091,849 A * | 7/2000 | Spaulding et al. | 382/162 |
| 6,324,305 B1 | 11/2001 | Holladay et al. | |
| 6,343,154 B1 | 1/2002 | Bottou et al. | |
| 6,400,844 B1 | 6/2002 | Fan et al. | |
| 6,549,658 B1 * | 4/2003 | Schweid et al. | 382/173 |
| 6,633,670 B1 | 10/2003 | Matthews | |
| 6,734,991 B1 * | 5/2004 | Schweid | 358/3.06 |
| 6,859,204 B2 * | 2/2005 | Curry et al. | 345/426 |
| 6,983,076 B2 * | 1/2006 | Curry et al. | 382/260 |
| 6,987,882 B2 * | 1/2006 | Curry et al. | 382/173 |
| 7,031,518 B2 * | 4/2006 | Curry et al. | 382/173 |
| 7,200,263 B2 * | 4/2007 | Curry et al. | 382/154 |
| 7,218,418 B2 * | 5/2007 | Curry et al. | 358/3.08 |
| 2003/0197878 A1 * | 10/2003 | Metois et al. | 358/1.9 |
| 2005/0002064 A1 * | 1/2005 | Curry et al. | 358/3.08 |
| 2005/0179948 A1 * | 8/2005 | Curry et al. | 358/3.2 |

OTHER PUBLICATIONS

U.S. Appl. No. 10/776,514, filed Feb. 12, 2004, Curry et al.
U.S. Appl. No. 10/776,608, filed Feb. 12, 2004, Curry et al.
U.S. Appl. No. 10/776,602, filed Feb. 12, 2004, Curry et al.
U.S. Appl. No. 10/776,620, filed Feb. 12, 2004, Curry et al.
U.S. Appl. No. 10/776,603, filed Feb. 12, 2004, Curry et al.
U.S. Appl. No. 10/776,509, filed Feb. 12, 2004, Claassen et al.
U.S. Appl. No. 10/776,508, filed Feb. 12, 2004, Curry et al.
U.S. Appl. No. 10/776,516, filed Feb. 12, 2004, Curry et al.
U.S. Appl. No. 10/776,612, filed Feb. 12, 2004, Curry et al.
U.S. Appl. No. 10/187,499, filed Jul. 2002, Donald J. Curry et al.
U.S. Appl. No. 10/188,026, filed Jul. 2002, Donald J. Curry et al.
U.S. Appl. No. 10/188,157, filed Jul. 2002, Donald J. Curry et al.
U.S. Appl. No. 10/188,249, filed Jul. 2002, Donald J. Curry et al.
U.S. Appl. No. 10/188,277, filed Jul. 2002, Donald J. Curry et al.
U.S. Appl. No. 10/612,057, filed Jul. 2003, Donald J. Curry et al.
U.S. Appl. No. 10/612,062, filed Jul. 2003, Donald J. Curry et al.
U.S. Appl. No. 10/612,063, filed Jul. 2003, Donald J. Curry et al.
U.S. Appl. No. 10/612,064, filed Jul. 2003, Donald J. Curry et al.
U.S. Appl. No. 10/612,234, filed Jul. 2003, Donald J. Curry et al.
U.S. Appl. No. 10/612,246, filed Jul. 2003, Donald J. Curry et al.
U.S. Appl. No. 10/612,248, filed Jul. 2003, Donald J. Curry et al.
U.S. Appl. No. 10/612,250, filed Jul. 2003, Donald J. Curry et al.
U.S. Appl. No. 10/612,368, filed Jul. 2003, Donald J. Curry et al.
U.S. Appl. No. 10/612,461, filed Jul. 2003, Donald J. Curry et al.
U.S. Appl. No. 10/612,261, filed Jul. 2003, Donald J. Curry et al.
R. De Queiroz, "Compression of Compound Documents," *IEEE*, 1999.
Kite, T.D., et al. "A High Quality, Fast Inverse Halftoning Algorithm for Error Diffused Halftones." Image Processing, 1998. ICIP 98. Proceedings. 1998 International Conference on Chicago, IL, USA, vol. 2, Oct. 4, 1998. pp. 59-63.
Ibaraki, H., et al. "New Image Processing Method for Halftone Pictures," Electronics and Communications in Japan, Part I-Communications, Wiley, Hoboken, NJ, US, vol. 71, No. 7, Jul. 1, 1988. pp. 87-99.

\* cited by examiner

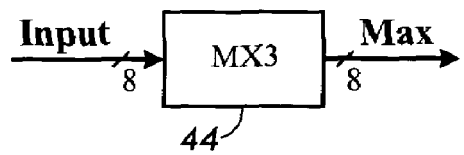
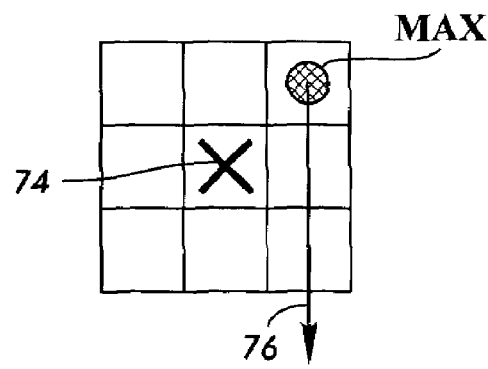
F7
(7x7)
FIG. 5
FIG. 6A
FIG. 6B

HALFTONE SCREEN FREQUENCY AND MAGNITUDE ESTIMATION FOR DIGITAL DESCREENING OF DOCUMENTS

This application is based on a Provisional Patent Application No. 60/393,244 filed Jul. 1, 2002.

CROSS-REFERENCE TO RELATED APPLICATIONS

The present application is related to the following co-pending applications: Ser. No. 10/187,499 entitled "Digital De-Screening of Documents", Ser. No. 10/188,026 entitled "Control System for Digital De-Screening of Documents", Ser. No. 10/188,277 entitled "Dynamic Threshold System for Multiple Raster Content (MRC) Representation of Documents", Ser. No. 10/188,157 entitled "Separation System for Multiple Raster Content (MRC) Representation of Documents", and Ser. No. 60/393,244 entitled "Segmentation Technique for Multiple Raster Content (MRC) TIFF and PDF all filed on Jul. 1, 2002 and all commonly assigned to the present assignee, the contents of which are herein incorporated by reference.

BACKGROUND OF THE INVENTION

1. Field of the Invention

The present invention relates generally to methods and systems for image processing, and more particularly to methods and systems for de-screening digitally scanned documents.

2. Description of Related Art

Almost all printed matter, except silver-halide photography, is printed using halftone screens. The need to estimate the halftone frequency and magnitude stems from the fact that almost all printed matter, with the exception of a few devices like dye-sublimation or silver-halide photography, is printed out using halftone screens. These halftones are very specific to the printing device and when scanned and re-halftoned may cause visible artifacts and/or unacceptable Moiré patterns if not properly removed. The suppression of halftones is especially important for color documents, since these are typically printed with four or more color separations containing slightly different screens at different angles and or frequencies, and these may interact with each other to cause undesirable spatial artifacts.

The successful removal of the original halftone screens is based on the ability to accurately estimate the local frequency. Therefore there is a need for an improved method and apparatus for estimating the halftone screen frequency and magnitude.

SUMMARY OF THE INVENTION

An efficient method and system for eliminating halftone screens from scanned documents while preserving the quality and sharpness of text and line-art is disclosed. The method and system utilizes one or more independent channels with different sensitivities (e.g., Max, High, and Low) to provide high quality frequency and magnitude estimation. The most sensitive channel (Max) derives the frequency estimate, and the remaining channels (e.g., High and Low) are combined to create the screen magnitude. The Max channel is the most sensitive and will usually report the existence of frequencies even when the screen is very weak. Therefore, the screen frequency must be additionally qualified by the screen magnitude. The screen magnitude can be interpreted as the level of confidence that the local neighborhood represents half-toned data.

BRIEF DESCRIPTION OF THE DRAWINGS

The features and advantages of the present invention will become apparent from the following detailed description of the present invention in which:

FIGS. 3-5 illustrates two-dimensional filter responses of various units.

FIGS. 6A and 6B illustrates a typical 3×3 max module structure.

DETAILED DESCRIPTION OF THE INVENTION

Figure 1:
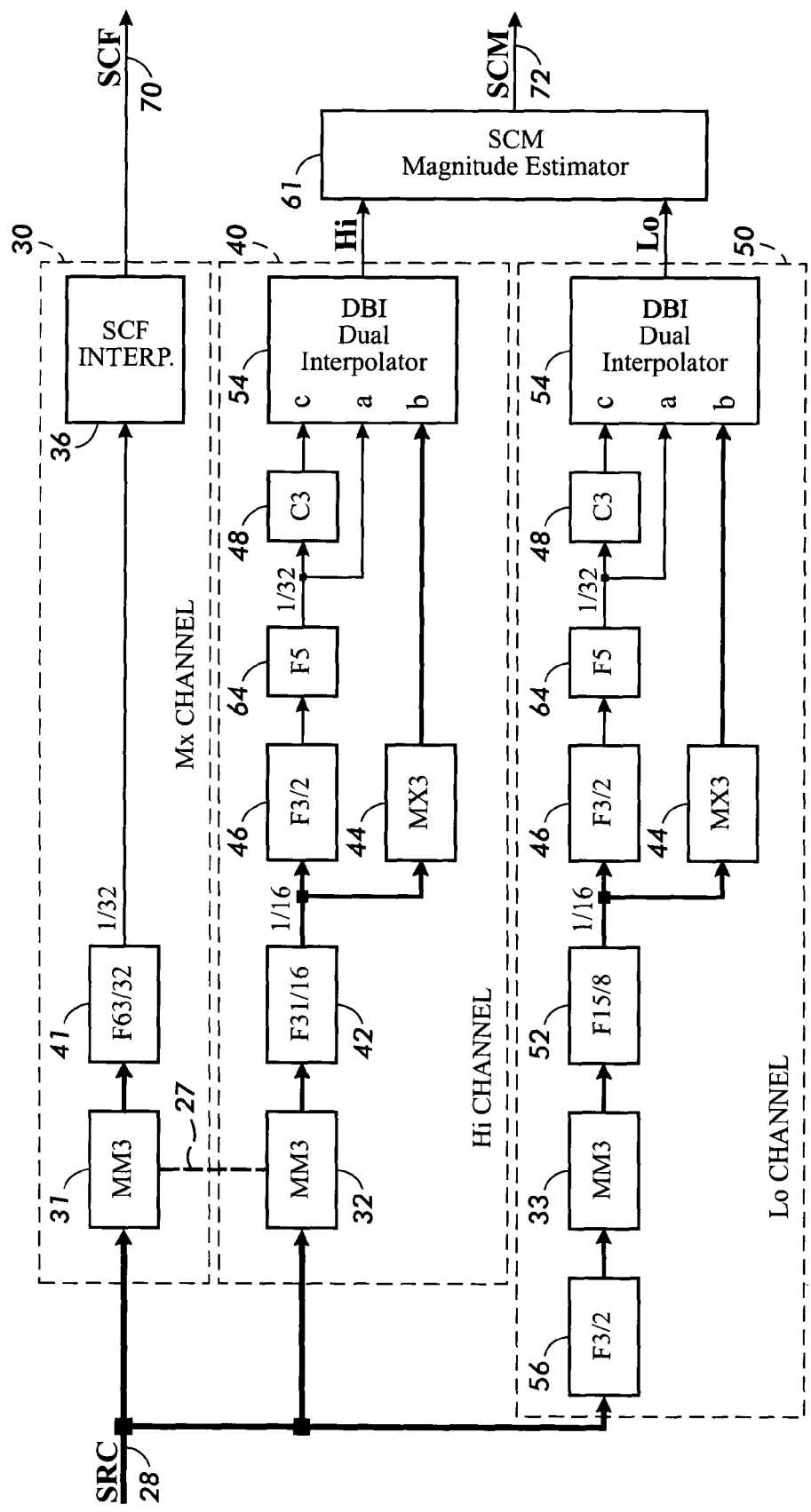
FIG. 1 is a block diagram of the system of a Screen estimator Module.

A new method and system are described for de-screening digitally scanned documents such that potential halftone interference and objectionable Moire patterns are eliminated or substantially reduced. Referring now to FIG. 1, a block diagram of the method and system of the present invention is represented by a Screen Estimator Module SEM. The Screen Estimator Module is responsible for estimating the instantaneous halftone frequency and magnitude (strength) at the current pixel of interest. The Screen Estimator Module operates on an 8-bit source image Src 28, and produces an 8-bit halftone frequency estimate Scf 70, and an 8-bit halftone magnitude estimate Scm 72.

The need to estimate the halftone frequency and magnitude stems from the fact that almost all printed matter, with the exception of a few devices like dye-sublimation or silver-halide photography, is printed out using halftone screens. These halftones are very specific to the printing device and, when scanned and re-halftoned for printing may cause visible artifacts and/or unacceptable Moiré patterns if not properly removed. A De-Screen Module (DSC) as described in Applicant's co-pending application Ser. No. 10/612,064, relies on the information that is produced by the Screen Estimator Module in order to eliminate (filter out) the original halftone patterns from the original scanned image. The suppression of halftones is especially important for color documents, since these are typically printed with four or more color separations containing slightly different screens at different angles and or frequencies, and these may interact with each other to cause undesirable spatial artifacts.

The Screen Estimator Module is comprised of one or more frequency estimation (e.g., Mx, Hi and Lo) working in parallel. The first Mx channel 30 is used for estimating the screen frequency Scf 70. The remaining channels (e.g., Hi 40 and Lo 50, respectively) are combined together at the very end to form the screen magnitude signal Scm 72. For high quality estimation of small point color-halftoned text, it may necessary to use two or more channels for the screen magnitude estimate in order to cover the desired frequency range of interest.

In one embodiment, the Screen Estimator Module SEM may use up to three frequency channels at different levels of sensitivities. The upper Mx channel 30 in FIG. 1 is tuned for maximum frequency sensitivity at the full source resolution and therefore is used for deriving the screen frequency estimate signal Scf 70. However, this channel is very sensitive and will usually report the existence of frequencies even when the screen is very weak. Therefore the screen frequency must be additionally qualified by the screen magnitude Scm 72.

The Hi channel 40 in FIG. 1 is tuned for moderate frequency sensitivity that is less sensitive than the Mx Channel 30. The two Channels Mx 30 and Hi 40, operate at the full source resolution. The Lo channel 50 is also tuned for moderate sensitivity. However, in contrast to the Mx 30 and Hi 40 Channels, the Lo 50 Channel is operating on a sub-sampled signal, outputted from the triangular Lo Channel filter F3/2 56 at half the source resolution in each direction. The screen magnitude signal Scm 72 is derived from the analysis of one or more the frequency estimates that are produced by Hi 40 and Lo 50 Channels.

Each frequency channel is made up of a plurality of Min-Max texture detectors MM3 31, 32 and 33 to be described below, followed by averaging filters 41, 42 and 52 respectively. The Mx 30 and Hi 40 Channel MM3 32 units operate on the single channel 8 bit incoming source signal Src 28, while the Lo Channel MM3 32 operates on a sub-sampled signal at half the resolution. The Lo Channel F3/2 filter 56 is responsible for filtering and sub-sampling the source signal Src 28 by a factor of 2× in each direction and driving the Lo Channel MM3 unit 32.

The three MM3 Min-Max modules 31, 32 and 33 are used for finding peaks and valleys in the 2D input signal. Since the Mx 30 and Hi 40 Channels share the same Src input signal 28, they duplicate the first stage calculations of a MM3 unit 32. However, different thresholds are applied in the second stages of the two units producing the two independent results. The dotted line 27 in FIG. 1 is intended to serve as a reminder that the front-end portions of the two MM3 units 32 may be computed once and then shared.

A detailed description of the Min-Max detector units is given below. The units are basically examining the content of a 3×3 window centered on the current pixel of interest and analyzing, using adaptive thresholding, if the center pixel is significantly larger or smaller relative to its eight surrounding neighbors. If so, the center pixel is regarded to be a peak (if larger) or valley (if smaller) respectively. By counting the number of peaks and valleys per unit area, a measure of the local frequency is obtained.

Each MM3 unit outputs 31, 32 and 33 have only 1 bit of precision, but each is scaled by a configuration factor DotGain prior to the first subsequent stage of filtering. Each unit operates one or more color channel of the input signal. However, in this embodiment only 1 channel, the luminance channel is used. The DotGain factor for the Lo channel 50 is divided by some factor, such as 4. Note this scaling can be postponed to the normalization step of the first subsequent filter by adjusting that stage's normalization factor.

The outputs from the MM3 Min-Max detectors 31, 32 and 33 are passed through different averaging and sub-sampling filters. In order to avoid aliasing problems with the sub-sampling, the spatial filter span in each case is twice the sub-sampling ratio minus one. The Mx Channel 30 uses a triangular 2D F63/32 filter 32 that reduces the bandwidth by a factor of 32× in each direction (approx. one-thousandth of the source bandwidth).

Likewise, the Hi Channel 40 MM3 output is applied to a cascade of two triangular 2D subsampling filters—the F31/16 filter 42 and F3/2 filter 46. The output from the cascaded filtering units is also sub-sampled by a factor of 32× in each direction (16× in the first filter and 2× in the second), and therefore the output is at the same data rate as for the Mx Channel 30.

Similarly, the Lo Channel 50 uses a cascade of two triangular 2D filters F15/8 52 and F3/2 46. The output from the second filtering unit is also sub-sampled by a factor of 32× in each direction (2× first by F3/2 followed by 8× and 2×). The higher bandwidth data paths are noted in FIG. 1 using wide black lines for the source bandwidth, lighter lines for $\frac{1}{16}$ the bandwidth, and thin black lines for $\frac{1}{32}^{nd}$ the bandwidth. The reduction factor is also specifically noted by the numbers.

In both the Hi 30 and Lo 40 Channels, a sample of the $\frac{1}{16}$ resolution signal is passed to MX3 units 44. These perform a 3×3 Max operation (gray dilation). The outputs are sent to the b input of each Channel Dual Bilinear Interpolation unit DBI 54, respectively.

Unlike the Mx Channel 30, the magnitude estimates Hi 40 and Lo 50 Channels contain an additional smoothing/averaging F5 64 stage to further reduce spatial noise. The F5 units 64 are 5×5 triangular weight (non-subsampling) filters. The filtered outputs from these units are sent to inputs of their respective Dual Bilinear Interpolation units DBI 54. The outputs are also are passed through the C3 contrast units 48 which search for the maximum difference in a 3×3 window centered on the current pixel. The C3 outputs become the c inputs to the DBI units 48, respectively.

The Mx Channel 30 averaged at $\frac{1}{32}$ resolution is sent to a bilinear interpolation unit SCF 36. The 3 signals produced by each of the Hi 40 and Lo 50 Channels are sent to their respective DBI units 54. These units perform dual bilinear interpolation to bring the sub-sampled input resolution back to the original source resolution. The a and c DBI inputs are at $\frac{1}{32}$ resolution and the b inputs are at $\frac{1}{16}$ resolution. The output bandwidth from the interpolation units is substantially higher than the input. For example, with the factor of 32× above, the interpolation units produce 1024 output pixels for each input pixel.

The interpolated output of the Mx Channel 30 interpolation unit SCF 36 is the 8-bit estimated screen frequency Scf 70. The outputs of the other channels such as Hi 40 and Lo 50 Channels Dual Interpolation units (Hi and Lo) are combined together in the Magnitude Estimate Module SCM 61. Its output is the 8-bit estimated screen magnitude signal Scm 72. The estimated screen frequency and magnitude signals Scf 70 and Scm 72 are exported to the De-Screen Module DSC and (Scm only) to the Segmentation Module SEG (both not shown). A more detailed description of the various elements of the Screen Estimator Module is provided below.

Figure 2:
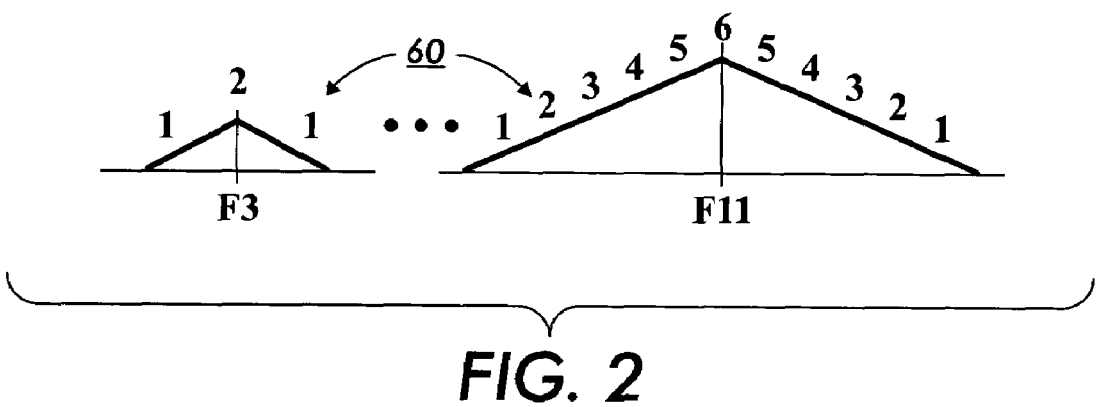
FIG. 2 illustrates one-dimensional filter responses of various filter units.
Figure 3:
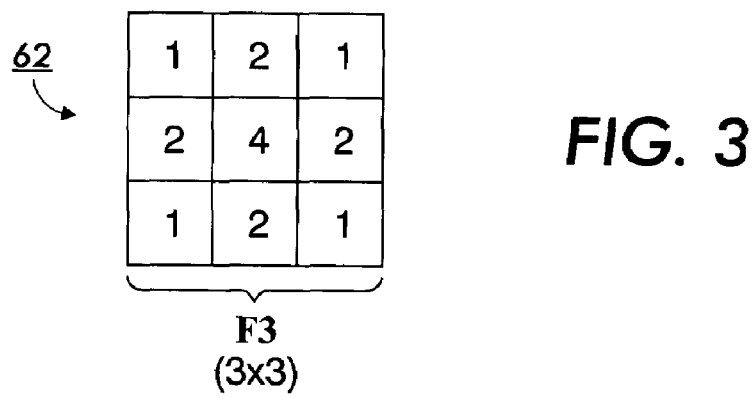
Figure 4:
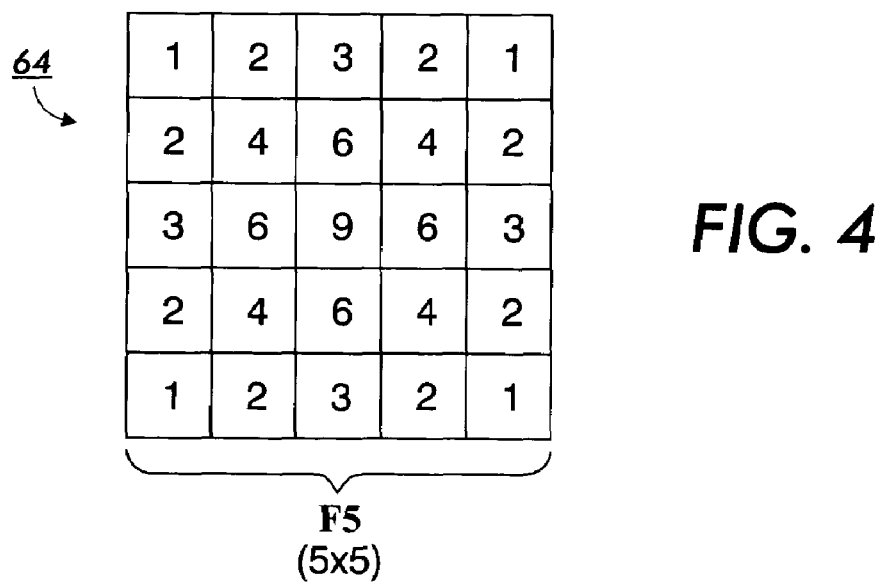

FIG. 2 illustrates one-dimensional filter responses of various filter units and FIGS. 3-5 illustrates two-dimensional filter responses of various units. These Filtering Units are used for the purpose of smoothing or averaging the input signals to remove high frequencies. Each filter unit implements a square, separable and symmetric 2D FIR (Finite impulse response) filter. The filter response is identical in the horizontal and vertical directions. If the input to the filter is a color signal, the same filter response is independently applied on each one of the color components. The 1D filter

60 response has a symmetric triangular shape with integer coefficients as illustrated in FIG. 2. The particular filter shape (but any other filter shapes are covered) was chosen for ease of implementation.

The general filter form is referred to as an Fn/k filter, where n is the filter size (overall span in either x or y) and k is the amount of sub-sampling that is applied to the filtered output in each direction. The sub-sampling factor k is omitted when k=1. Note that in this document the filter span n is assumed to be an odd integer (n=1, 3, 5, . . . ) such that the 2D filter response has a definite peak at the valid center pixel location.

Examples for the 1D and 2D filter response are illustrated in FIGS. 1 and 2. FIG. 2 shows the non-normalized 1D filter 60 response for F3 and F11, and FIGS. 3 through 5 shows the resulting non-normalized 2-D coefficients for F3 62, F5 64, and F7 66, respectively.

Since the filter is separable, the 2D filter response can be implemented by cascading two 1D filters in the horizontal and vertical directions. The filters are all operating at the full input data rate, but the output may be sub-sampled by a factor of k in each direction. In many cases, although not always, the filter size n and the sub-sampling factor k satisfy the following relationship:

$$n=2*k-1$$

This represents 50% coverage overlap relative to the sub-sampled area. As an example, the overall 2-D response of the smallest 3×3 filter, F3 62, is:

$$F\_3 = \frac{1}{16}\begin{bmatrix}1\\2\\1\end{bmatrix}*(1,2,1) = \frac{1}{16}\begin{bmatrix}1 & 2 & 1\\2 & 4 & 2\\1 & 2 & 1\end{bmatrix}$$

Larger filters are similarly described. Since these filters are separable, it is best to implement them in two 1D steps, orthogonal to each other. Each filter output is normalized by the sum of the coefficients to make it fit back into the 8-bit range. Some filters, such as an F3 filter 62, have a total sum of weights that is a power of 2 numbers. These filters will require no division in the normalization step as it can simply be implemented as a rounding right shift of 2. For example, the F3 filter 62 has a total 1D weight of 1+2+1=4. A rounded division by this weight could be accomplished with an add of 2 followed by a shift right by 2.

$$normalizedResult=(sum+2)>>2$$

In general, when rounding is called for, it is typically applied by adding in half the divisor prior to performing the shift. Since right shift, performed on 2's complement coded binary numbers is the equivalent of floor (numerator/2^shift), adding half the divisor causes nearest integer rounding for both signed and unsigned numerators.

When the total weight of a filter does not add up to a power of 2, the compute-intensive division operation is avoided by approximating it using a multiplication by ratio of two numbers, where the denominator is a chosen power-of-2 number.

The subsampling filters F3/2 F15/8 F31/16 and F63/32 all have power of 2 1D weights: 4,64,256 and 1024 respectively. So normalization is just a rounding right shift. The F5 filter 64 has a 1D weight of 9 and can be approximated by multiplication by 57 prior to a rounding right shift by 9 positions. Note that multiplication of x by 57 can be done without using a variable multiply by using shift/add/sub operations such as:

$$x*57=x<<6-x<<3+x$$

Referring to FIGS. 6A and 6B, the MX3 Max units 32 used in the Hi 40 and Lo 50 Channels search for the maximum value in a 3×3 window centered on the current pixel 74 of interest. The input is an 8-bit signal. The search for the max value is performed over the 9 pixels of the 3×3 window. This gray dilation module produces an 8-bit output that is made up of the largest pixel value 76 found within the boundaries of the search window. The MX3 max algorithm is illustrated in FIG. 6B.

Figure 7A:
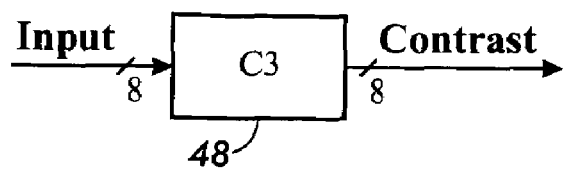
FIGS. 7A and 7B illustrates a typical 3×3 contrast module structure.
Figure 7B:
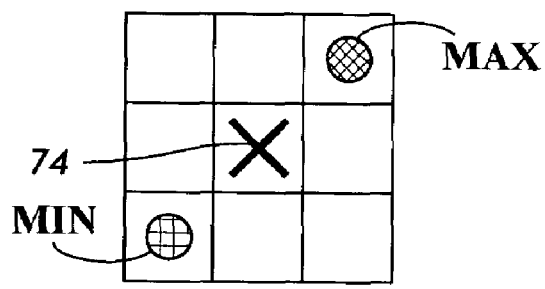
Figure 7B:
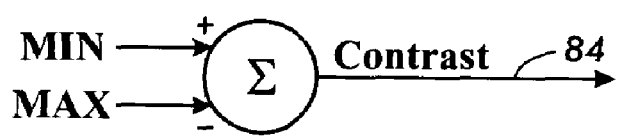

Referring now to FIGS. 7A and 7B, these C3 Contrast modules 48 are designed for measuring the amount of local contrast at the input. The contrast is defined as the difference between the largest and smallest pixel values within a window centered on the current pixel 74 of interest. The C3 Contrast units 48 utilize a window size of 3×3, centered on the current pixel 74 of interest. The input to the contrast units is an 8-bit signal. The contrast module produces an 8-bit monochrome output (single channel) 84. The operation of the C3 Contrast Units 48 is illustrated in FIG. 7B. The operation is as following: for each pixel location, the content of a 3×3 window is independently searched for the minimum and maximum pixel values. The output contrast value is defined to be:

$$Contrast=max-min$$

Since the largest and smallest pixel values are always between 0 and 255 for an unsigned 8-bit input signal, the contrast is guaranteed to be in the range [0 . . . 255], and no special normalization is necessary.

The three Min-Max Detection modules 31, 32 and 33 are used for finding peaks and valleys in the input signal. By counting the number of peaks and valleys per unit area, a measure of the local frequency is obtained. Each one of the Mx 30, Hi 50 and Lo 40 Channels uses a similar MM3 unit 31, 32 and 33. The one difference between the three units is that each unit uses a different set of thresholds to adjust the frequency sensitivity of the corresponding channel and the Lo Channel MM3 32 is operating at ¼ the speed of the other two.

All 3 units 31, 32 and 33 operate on a one component gray source. Each unit utilizes 3×3 window to indicate when the center pixel is at an extreme value (either peak or valley) relative to its 8 neighbors, following the logic below. The output from each Min-Max Detection units 31, 32 and 33 is a 1-bit signal indicating that the corresponding Src pixel is in an extreme value state (can be extended to other color channels as well).

Figure 8:
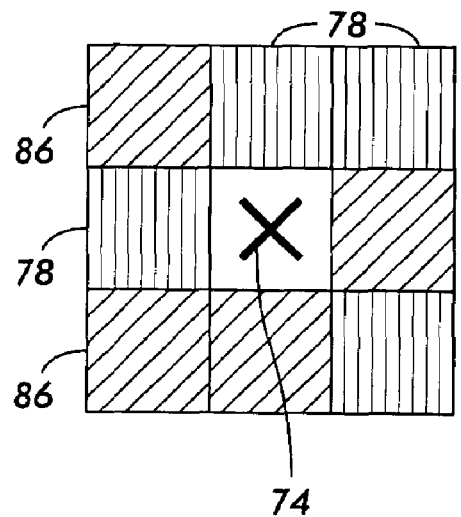
FIG. 8 shows a min-max detection structure within a 3×3 window.

The MM3 Min-Max Detection structure is depicted in FIG. 8. For each pixel, the outer ring of 8 pixels surrounding it (the current pixel of interest) is first analyzed. The 8 outer pixels are further divided into two sets of 4 pixels each as shown in FIG. 8. The partitioning of the outer ring into two sets is useful for reducing the likelihood of false alarms in detecting straight-line segments as halftones (since most commonly encountered halftones are likely to be clustered dots). For each set, the pixel values are compared among the members 78 and 86 of the set to determine the minimum and maximum values within each set independently:

$$A_{max}=\max (Aij); \text{ over all } (i, j) \text{ belonging to the set } A$$

$$A_{min}=\min (Aij); \text{ over all } (i, j) \text{ belonging to the set } A$$

$$B_{max}=\max (Bij); \text{ over all } (i, j) \text{ belonging to the set } B$$

$$B_{min}=\min (Bij); \text{ over all } (i, j) \text{ belonging to the set } B$$

From these, the overall outer ring and total min are computed. Using the total min and 2 configuration parameters, a noise level is then computed.

Noise=ConThr+$X$*NoiseFac/256

The center pixel 74 value X is defined to be at a peak if it is [significantly] larger than the maximum pixel value of either set:

If [($A_{max}$+Noise<$X$) AND ($B_{max}$<$X$)] return(1)

Similarly, the center pixel 74 value X is defined to be at a valley if it is [significantly] smaller than the minimum pixel value from either set:

If [($A_{min}$>$X$+Noise) AND ($B_{min}$≧$X$)] return(1)

The above equations determine the two conditions where the output from the 3×3 detection window are set to 1; in all other cases the output will be set to 0.

Figure 9A:
FIGS. 9A and 9B illustrates a single interpolation unit.

The Screen Frequency and Magnitude Module SEM makes use of one Bilinear Interpolation Unit SCF 36 and two Dual Bilinear Interpolation Units DBI 54. The Single Interpolation Unit SCF 36 is applied to the high sensitivity frequency estimation Mx Channel 30, as shown in FIG. 9A, to generate the screen frequency signal SCF 70. The Hi 40 and Lo 50 Channel DBI Dual Interpolation Units 54 are used prior to combining them together to form the screen magnitude SCM 72.

The three interpolation modules interpolate (up-sample) the signal back to the source resolution. The input signals are up-sampled by a factor of 32 in each direction to restore it to the original resolution. Each interpolation unit is performing bilinear interpolation, essentially generating 32*32=1024 pixels for each original pixel. The step size of the bilinear interpolation is $\frac{1}{32}^{nd}$ of the original pixel grid. The following paragraphs describe in more details the Single and Dual Interpolation Units.

The Single Interpolation Unit SCF 36 is applied on the sub-sampled output of the screen frequency estimator Mx Channel 30. The purpose is to restore the Mx Channel 30 output to the full source resolution of the input to the Screen Estimator Module SEM. The Interpolation technique is based on a 2D bi-linear interpolation by a factor of 32× in each direction. After interpolation, the instantaneous screen frequency estimate signal SCF is forwarded to the De-Screen Module DSC.

Figure 9B:
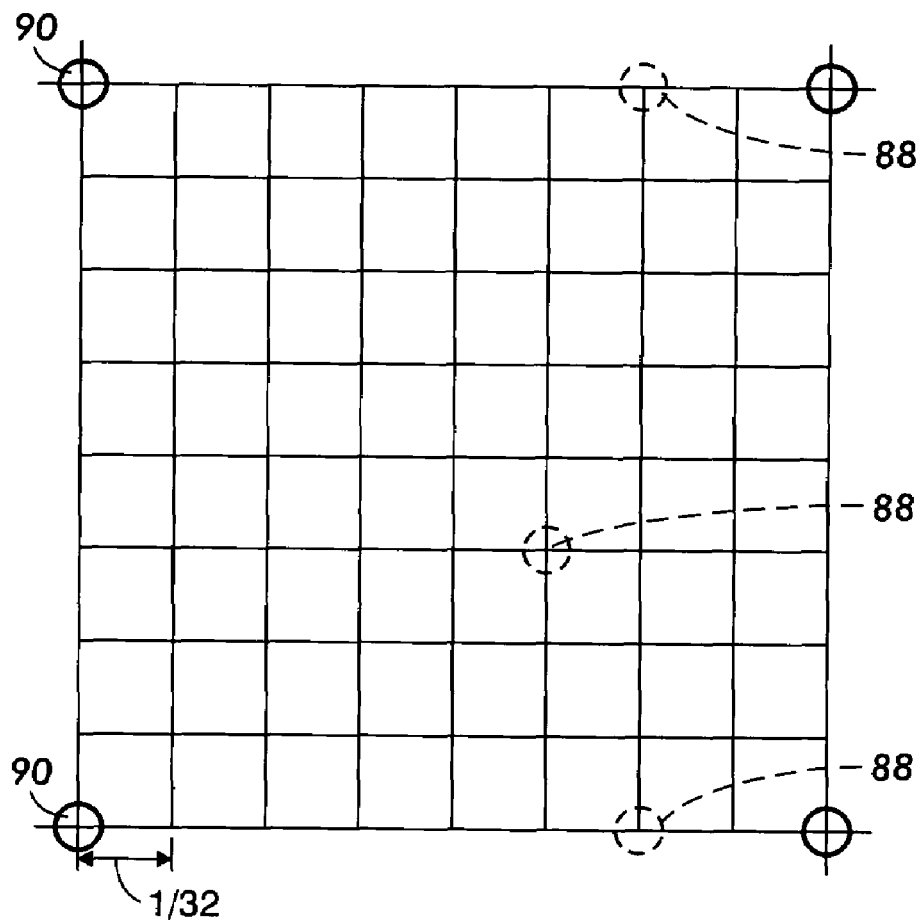

The block diagram of the Single Interpolation Unit SCF is shown FIGS. 9A and 9B. The input to the Unit is the sub-sampled Mx Channel output representing the screen frequency. For each input pixel, the unit produces 32×32=1024 output pixels. The thick lines in FIG. 9A note the higher output bandwidth. Both the input and output are 8-bit monochrome signals. The output is the 8-bit screen frequency estimate signal Scf 70.

The operation of the Single Interpolation Units SCF 36 is illustrated at the FIG. 9B. The circled locations 88 and 90 indicate the location of the input pixels. The output pixels are located at the grid intersection points. Note that for simplicity, FIG. 9B only shows an interpolation factor of 8× in each direction, although the actual unit is required to support a factor of 32× in each direction. The step size for the bilinear interpolation is $\frac{1}{32}^{nd}$ of the original pixel grid. The details of implementation are straightforward.

Figure 10:
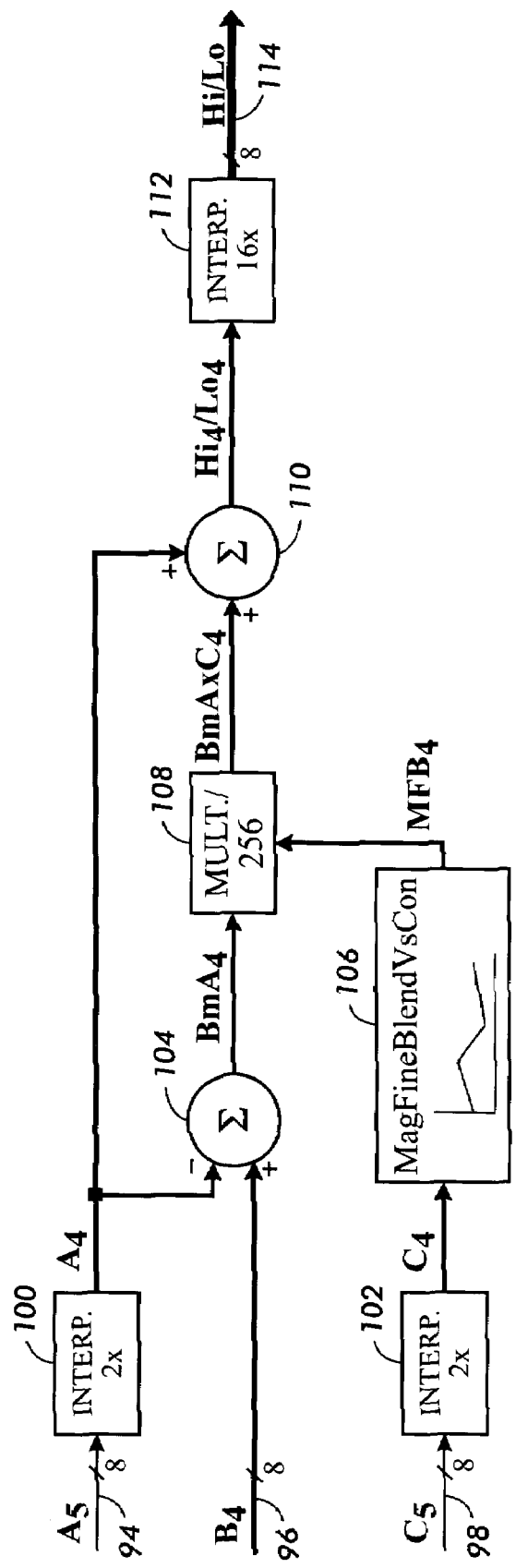
FIG. 10 is a block diagram of a structure of one dual bilinear interpolation units.

The Hi and Lo Channel DPI Dual Interpolation Units are similar to the Single Interpolation Unit SCF, except that there are two interpolation stages with an additional blending operation in the middle. The Structure of one of the Dual Interpolation Units is shown in FIG. 10. The Dual Interpolation Units operate on 3 signals 94, 96 and 98 generated in each of the Hi and Lo magnitude estimate channels.

As can be seen in FIG. 10, each Dual Interpolation Unit is composed of two interpolation stages 100 and 102, respectively. The first stage includes the interpolation 100 of the $A_5$ 94 and $C_5$ 98 inputs by 2× in each direction. The interpolation 100 uses a simple bi-linear interpolation technique. The $A_5$ input 94 corresponds to the output of the F5 filter 64 units. Note the subscripts in FIG. 10 correspond to the level of subsampling. The subscript 5 indicates that the signal has been subsampled 5 times by a factor of ½ (1/32 total). The $C_5$ input 98 corresponds to the output of the 3×3 contrast units. As indicated in FIG. 1, both of these inputs have been previously sub-sampled by a factor of 32× in each direction. After interpolating the $A_4$ and $C_4$ outputs, of this first stage of interpolation are subsampled by 1/16. That is the same subsampling level of the $B_4$ input 96. It is now possible to compute $BmA_4$, the $B_4$ minus $A_4$ difference signal 104. $BmA_3$ is multiplied by the magnitude fine blend factor $MFB_3$ that is generated by applying $C_4$ to the MagFineBlenVsCon function 106. The $BmAxC_4$ signal is the result of multiplying 108 $BmA_4$ times $MFB_4$ and shifting right by 8. This gets added to $A_4$ in 110 to create $HI_4$ or $LO_4$ signals depending on the channel. The results are then fed to the 16× bilinear interpolation unit 112 producing the Lo or Hi output depending on the channel.

The MagFineBlenVsCon function 106 above is a programmable function. In one embodiment, the typical MagFineBlenVsCon function 106 above can be easily computed as y=(x−16)*12 where the output is then clamped between 0 and 192. The equations below incorporate this typical configuration value of MagFineBlenVsCon 106.

$BmA_4 = B_4 - A_4$ $MFB_4 = MagFineBlendVsCn3(C_4) = \max(0, \min(192, (C_4-16)*12))$ $BmAxC_4 = (BmA_4 * MFB_4) >> 8$ The purpose of this arrangement is to refine the magnitude estimate in places where it is subject to change. When the frequency magnitude estimate in one of the channels appears to be stable and constant, its value is used as the blended output. This happens due to the $C_4$ signal from the contrast measuring unit being close to zero, thereby selecting the A input. However, if the magnitude estimate begins to change, the $C_4$ signal increases, and the content of $B_4$ begins to influence the blended output. $C_4$ is proportional to the contrast, which is proportional to the magnitude of the derivative of the change. Therefore the resulting magnitude estimate is biased towards the direction of change once a certain level of change is detected.

The Screen Magnitude Estimator module SCM 54 in FIG. 1 takes as input the Hi and Lo outputs of the two dual interpolation units. It then adds together the contributions from each of the channels as following:

SCM=min(255, $SCM_H + SCM_L$)

Where $SCM_H$=max(0, (Hi−MagHiFrqThr)*MagHiFrqFac)

$SCM_L$=max(0, (Lo−MagLoFrqThr)*MagLoFrqFac)

Figure 11:
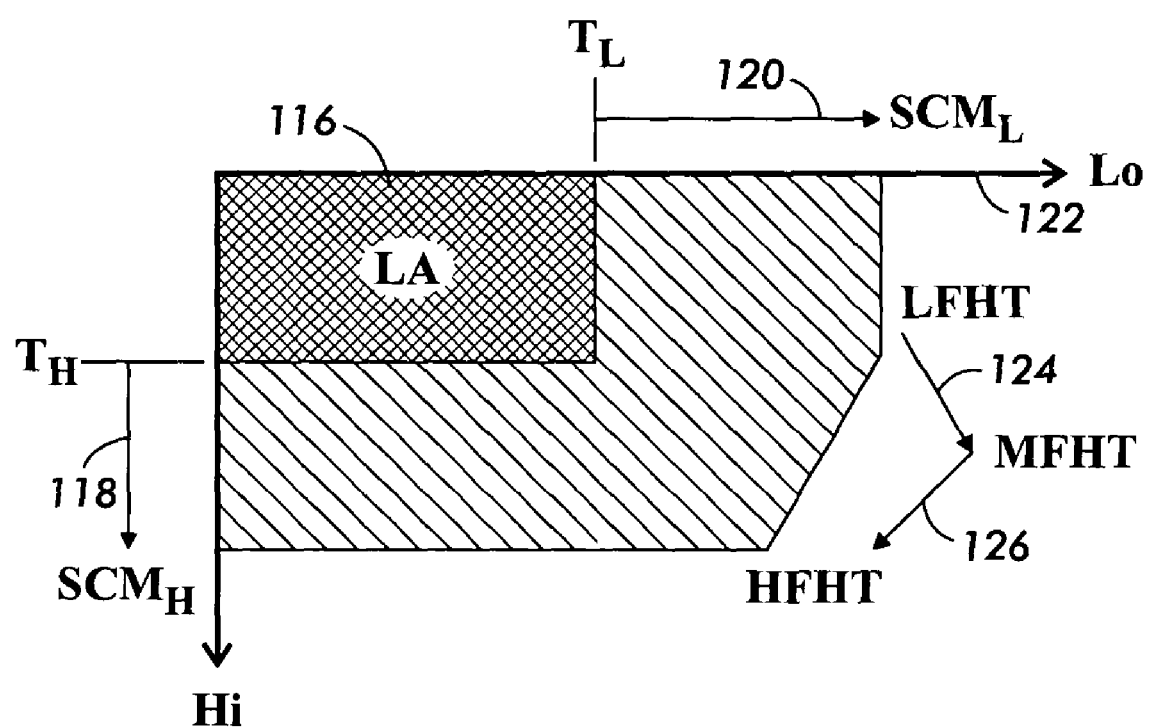
FIG. 11 illustrates a screen magnitude estimation equation.

FIG. 11 is a diagram illustrating the above equations and the clipping effect of the additional logic which limits the value of HTW to the allowed range. The region denoted as "LA" 116 represents the line-art region. As illustrated in FIG. 11, one particular color screen pattern can change from the location indicated as LFHT to MFHT 124 to HFHT 126 as its frequency is changed from high to medium to low. Since the curve illustrated by the loci on the 2D plot is convex, it is not possible to distinguish the screen frequency by observing either LO or HI alone.

While certain exemplary embodiments have been described in detail and shown in the accompanying drawings, those of ordinary skill in the art will recognize that the invention is not limited to the embodiments described and that various modifications may be made to the illustrated and other embodiments of the invention described above, without departing from the broad inventive scope thereof. It will be understood, therefore, that the invention is not limited to the particular embodiments or arrangements disclosed, but is rather intended to cover any changes, adaptations or modifications which are within the scope and spirit of the invention as defined by the appended claims.

What is claimed:

1. A method for determining a screen frequency and magnitude estimation of an image signal, the method comprising the operations of:
    (a) estimating in one or more channels each exhibiting different sensitivities for providing high quality instantaneous halftone frequency and magnitude estimation;
    detecting extrema in an image signal and a second filter output signal via a min-max texture detector included in each of frequency detection modules, and outputting respective detected signals; and
    filtering the respective detected signals via respective cascades of averaging filters and outputting respective filtered detected signals;
    (b) combining one or more instantaneous halftone frequency estimation from independent channels to create frequency magnitude estimation.

2. The method of claim 1 wherein a channel exhibiting highest sensitivity derives the frequency estimate.

3. The method of claim 1 wherein the operation of detecting extrema is performed by using a structure pattern within a window, the structure pattern having two distinct sets of pixels arranged such that, for any line segment crossing the structure pattern, each of the two sets of pixels does not lie entirely on one side of the line segment.

4. The method of claim 3 wherein operation (a) further comprises the operation of searching for a maximum value within a window in the output of each of the special filters via a module included in each of the frequency detection modules.

5. The method of claim 4 wherein operation (a) further comprises the operations of sub-sampling and interpolating.

6. The method of claim 1 wherein operation (a) further comprises the operations of sub-sampling and dual interpolation having a maximum unit and a contrast unit and further filtering.

7. The method of claim 1 wherein operation (a) comprises the operations of combining the outputs of one or more frequency detection modules and producing the frequency magnitude estimate signal, via a magnitude estimate module included in the screen estimate module.

8. The method of claim 7 wherein operation (a) comprises the operation of processing the contrast signal, the frequency estimate signal and the frequency estimate magnitude signal via at least one piecewise linear function block included in the pixel control module to produce the first control signal which includes information regarding which of the filter output signals are to be blended and the proportion of blending.

9. The method of claim 8 wherein operation (a) comprises the operation of processing the frequency estimate signal, the frequency estimate magnitude signal and a lowpass filtered version of the image signal, via a neutral logic block included in the pixel control module to produce a third control signal for controlling the neutrality of a current pixel.

10. A screen frequency and magnitude estimator comprising:
    (a) means for estimating in one or more channels each exhibiting different sensitivities for providing high quality instantaneous halftone frequency and magnitude estimation;
    (b) means for combining one or more instantaneous halftone frequency estimation from independent channels to create frequency magnitude estimation;
    wherein detecting extrema in an image signal and a second filter output signal via a min-max texture detector included in each of frequency detection modules, and outputting respective detected signals; and
    means for filtering the respective detected signals via respective cascades of averaging filters and outputting respective filtered detected signals.

11. A screen frequency and magnitude estimator according to claim 10 wherein a channel exhibiting highest sensitivity derives the frequency estimate.

12. A screen frequency and magnitude estimator according to claim 10 wherein the operation of detecting extrema is performed by using a structure pattern within a window, the structure pattern having two distinct sets of pixels arranged such that, for any line segment crossing the structure pattern, each of the two sets of pixels does not lie entirely on one side of the line segment.

13. A screen frequency and magnitude estimator according to claim 12 wherein operation (a) further comprises the operation of searching for a maximum value within a window in the output of each of the special filters via a module included in each of the frequency detection modules.

14. A screen frequency and magnitude estimator according to claim 13 wherein operation (a) further comprises the operations of sub-sampling and interpolating.

15. A screen frequency and magnitude estimator according to claim 14 wherein operation (a) further comprises the operations of sub-sampling and dual interpolation having a maximum unit and a contrast unit and further interpolation and filtering for one or more of frequency channels.

16. A screen frequency and magnitude estimator according to claim 15 wherein operation (a) comprises the operations of combining the outputs of one or more frequency detection modules and producing the frequency magnitude estimate signal, via a magnitude estimate module included in the screen estimate module.

17. A screen frequency and magnitude estimator comprising:
    (a) means for estimating in one or more channels each exhibiting different sensitivities for providing high quality instantaneous halftone frequency and magnitude estimation;
    (b) means for combining one or more instantaneous halftone frequency estimation from independent channels to create frequency magnitude estimation wherein a channel exhibiting highest sensitivity derives the frequency estimate;
    means for providing a control signal, based on the input signal contrast, to hold the frequency estimate signal stable even near edges of halftone areas, using a maximum frequency unit and a dual interpolation unit.

* * * * *